July 4, 1939.　　　　C. T. PEACOCK　　　　2,164,543
RIDGE BUSTING DEVICE FOR FARM TRACTORS
Filed June 21, 1938　　　3 Sheets-Sheet 1

Inventor
Charles T. Peacock.
By Martin E. Anderson
Attorney

July 4, 1939.  C. T. PEACOCK  2,164,543
RIDGE BUSTING DEVICE FOR FARM TRACTORS
Filed June 21, 1938  3 Sheets-Sheet 2

Inventor
Charles T. Peacock.
By Martin E. Anderson
Attorney

July 4, 1939.  C. T. PEACOCK  2,164,543
RIDGE BUSTING DEVICE FOR FARM TRACTORS
Filed June 21, 1938  3 Sheets-Sheet 3
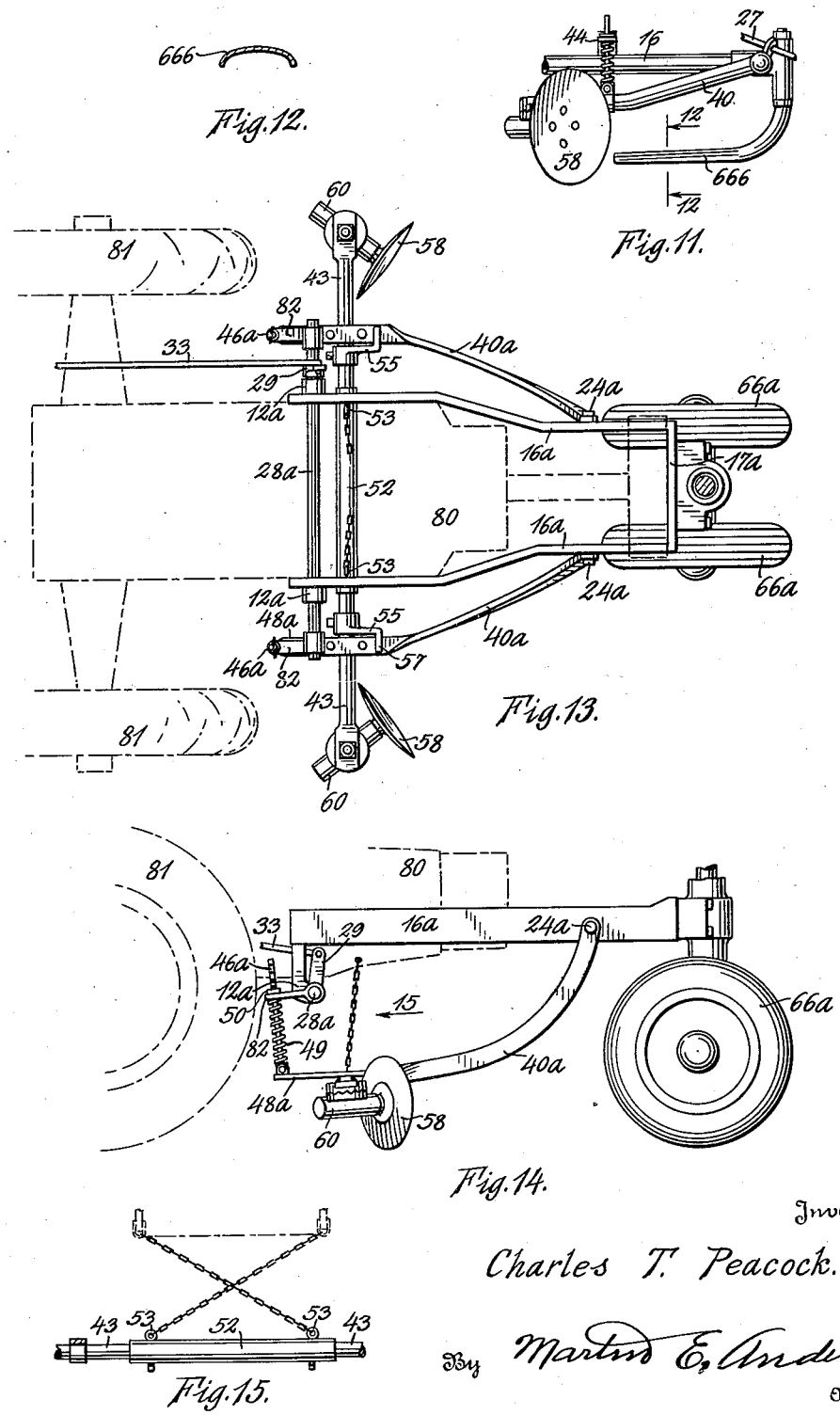
Inventor
Charles T. Peacock.
By Martin E. Anderson
Attorney Patented July 4, 1939

2,164,543

UNITED STATES PATENT OFFICE 2,164,543

RIDGE BUSTING DEVICE FOR FARM TRACTORS

Charles T. Peacock, Arriba, Colo.

Application June 21, 1938, Serial No. 214,952

16 Claims. (Cl. 97—47)

This invention relates to improvements in ridge busting devices for farm tractors.

In many parts of our country but more especially in the semiarid regions crops are raised every other year only. During the year when the land is fallow it is usually listed and maintained in condition to absorb moisture. In addition to listing it is now quite common practice to dam the lister furrows to prevent water from flowing along them: this type of farming is known as "basin farming".

Where lister furrows have been provided with spaced dams some difficulty is experienced in operating the ordinary wheeled tractors because the passage of the wheels over the ridges between the lister furrows or over the dams rocks the tractor about a transverse axis in so violent a manner as to greatly handicap the work.

It is evident that a wheeled tractor is not well adapted for use on listed fields having the lister furrows provided with spaced dams because the wheels are spaced to travel in the lister furrows and consequently will pass over the dams.

It is the object of this invention to produce a device that can be attached to the front end of a tractor and provided with a disk or other equivalent means, in front of each wheel, for the purpose of busting a portion of the ridges and leveling the dams so as to provide a fairly level surface for the wheels to travel over.

Another object is to produce a device of the kind mentioned that can be readily attached to a tractor and removed therefrom and which will have a floating connection with the tractor which permits the latter to have a limited movement independently of the attachment.

A further object is to produce a device of the type mentioned which is adjustable both transversely and vertically and which can be moved to inoperative position when not in use.

The above and other objects that may become apparent as this description proceeds are attained by means of a construction and an arrangement of parts that will now be described in detail and for this purpose reference will be had to the accompanying drawings in which the invention has been illustrated in its preferred form, and in which, Figure 1 is a top plan view of the attachment showing the same attached to the front axle of a tractor.

Figure 1:
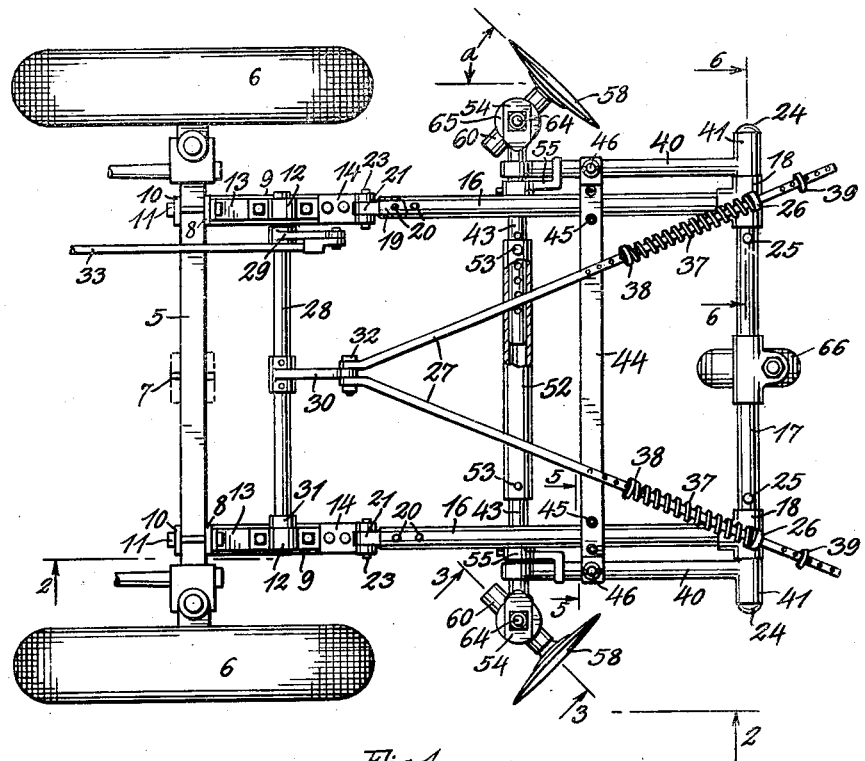
Figure 5:
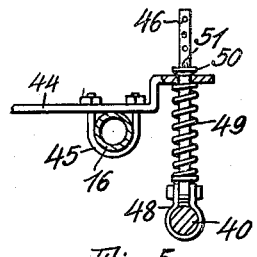
Figure 7:
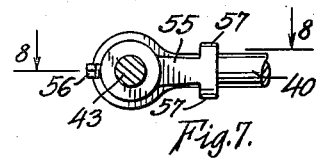
Figure 6:
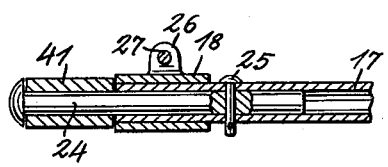
Figure 8:
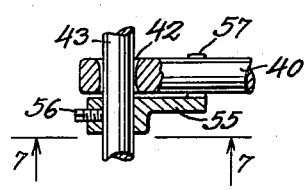
Figure 9:
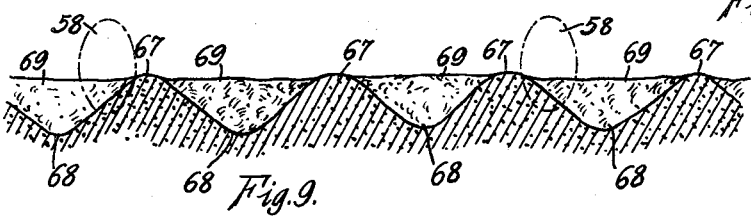
Figure 10:
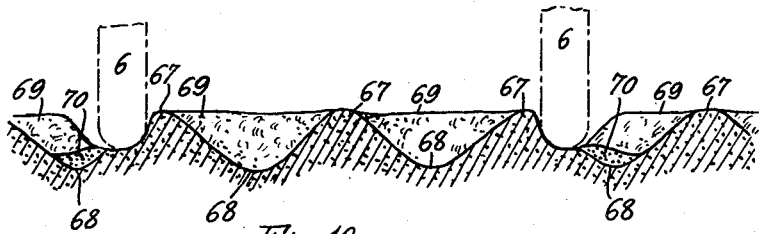

Figure 5 is a section taken on line 5—5 Figure 1.
Figure 6 is a section taken on line 6—6 Figure 1.
Figure 7 is a section taken on line 7—7 Figure 3.
Figure 8 is a section taken on line 8—8 Figure 7.
Figure 9 is a section through a field, having dammed lister furrows, taken transversely of the furrows and indicating by dotted lines the position of the disks;

Figure 10 is a section, similar to that shown in Figure 9 and shows the tracks provided for the tractor wheels;

Figure 11 is a fragmentary side elevation showing a runner substituted for the caster wheel;

Figure 12 is a section taken on line 12—12, Fig. 11;

Figures 13 and 14 are respectively a plan and an elevation of a slightly modified form of the invention; and Figure 15 is a view looking in the direction of arrow 15 in Fig. 14.

In the drawings, numeral 5 designates the front axle of a wheeled farm tractor and numeral 6 designates the front wheels of the tractor. The front end of the tractor is supported from the center of the axle and the latter can rock about a pivot which has been designated by numeral 7.

Two L-shaped brackets, of identical construction, having a vertical arm 8 and a horizontal arm 9 are attached to the front axle by a plate 10 and bolts 11. Attached to the top of arms 9 are bearings 12 that have been illustrated as formed from a flat steel bar. One end of each bearing is upwardly and rearwardly inclined so as to form a brace 13. Attached to the front ends of each arm 9 is a hinge member 14 having an elongated, vertically extending opening 15. A frame comprising tubular sides 16 and a tubular transverse bar 17, joined by T's 18 is attached to the hinge member 14 in the following manner: A plug 19 extends into the rear ends of pipes 16 and are secured in place by bolts or rivets 20. The plugs terminate in flattened portions 21 that extend into the notches in the front ends of the hinge members 14 and carry pivot pins 23 that extend through the openings 15 so as to form a floating hinge. A headed pivot pin 24 is inserted into each end of the front frame member 17 and is held in place by means of bolts, pins or rivets 25.

It will be observed that each T is provided on its upper surface with a vertical lug 26 through which a rod 27 extends.

Journaled in bearings 12 is a shaft 28 and secured to this shaft, adjacent the inner end of one of the bearings, is a crank arm 29. A similar crank arm 30 is attached to the shaft at its center point and a collar 31 is attached to the shaft adjacent the inner end of the other bearing. The two rods 27 are connected with the crank arm 30 by means of a pivot 32. A connecting rod 33 has its forward end pivoted to the end of crank arm 29 and its rear end pivotally connected with a lever 34 that is movable about a pivot 35 and operatively associated with a quadrant 36, both of which are carried by the tractor body. It is evident that by rocking lever 34 about pivot 35 shaft 28 can be rocked in its bearings.

A helical compression spring 37 is carried by each rod 27 and has one end abutting the lug 26 while the other end abuts a washer or stop 38 that is longitudinally adjustable on the rod. Washers or stops 39 are adjustably connected with rods 27 between lugs 26 and the ends of the rods. When lever 34 is moved counterclockwise stops 39 will engage lugs 26 and the front end of the frame can be raised and the parts held in raised or inoperative position when not needed.

Arms 40 are provided at their front ends with bearings 41 through which pins 24 extend in the manner shown in Figure 6. The rear ends of arms 40 have openings 42 for the reception of the round bars 43 to which reference will hereafter be made.

A flat bar 44 connects the tubular sides 16 and is attached to the sides by means of U-bolts 45 in the manner shown in Figure 5. From Figure 5 it will be seen that the ends of bar 44 are offset in an upward direction and are provided with openings for the reception of pins 46. The lower ends of pins 46 are pivotally attached to arms 40 by means of straps 48. Helical coil springs 49 surround the pins and are normally under compression and maintained in compressed state by washers 50 held in place by pins 51.

The two bars 43 are connected by means of a tubular coupling 52 and by pins 53 so that the overall length can be changed at will. The outer ends of bars 43 are flattened as indicated at 54. Arms 55 are attached to each bar 43 and are held against rotation by means of set screws 56, in the manner shown in Figures 7 and 8. The ends of arms 55 are provided with spaced fingers 57 that embrace the arms 40. When the set screws are loosened the bars can be moved both rotarially and longitudinally in the hubs of the arms, for the purpose of adjustment, and when the adjustments are effected the set screws are tightened to hold the parts in adjusted position. It will be apparent that springs 49 exert a force tending to increase the angle $w$ between sides 16 and arms 40 but permit the arms to move upwardly when subjected to sufficient force to compress the springs.

Figure 3:
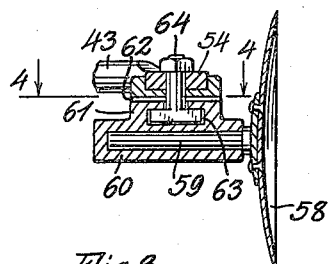
Figure 3 is a section taken on line 3—3 Figure 1.
Figure 4:
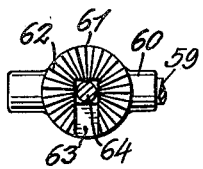
Figure 4 is a section taken on line 4—4 Figure 3.

Attached to the flattened ends of bars 43 are disks 58 and the means employed for this purpose has been shown in Figures 3 and 4 and will now be described.

Secured to each disk and extending from the convex surface thereof is a shaft 59, which is journalled in a bearing block 60. The bearing block is provided, on one side, with a circular projection 61 having a flat face 62 provided with radial ribs. The projections are also provided with T-slots in which are secured bolts 64. A circular plate 65 is positioned between the surface 62 and the flattened end of bar 43 and this plate has a groove into which the flattened end fits, in the manner shown in Figure 3. Bolts 64 extend through openings in plate 65 and in ends 54. By loosening bolts 64 the bearing blocks may be rotarily adjusted about the axis of the bolts so as to vary the angle $a$, Figure 1.

Figure 2:
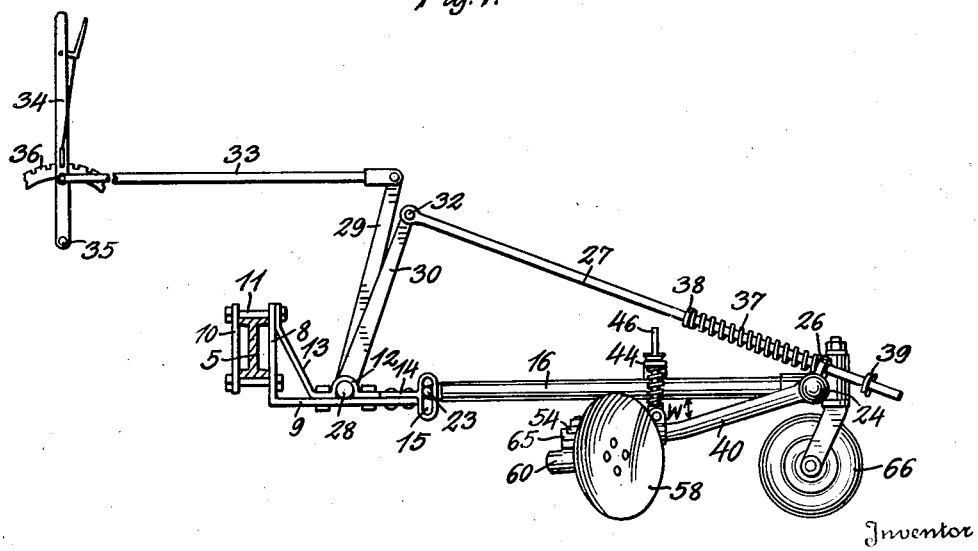
Figure 2 is a view, partly in elevation and partly in section, taken on line 2—2 Figure 1.

In order to support the front end of the frame from the ground and to thereby maintain it at the predetermined height, a caster wheel 66 is secured to the middle of end bar 17, in the manner indicated in Figures 1 and 2. The wheel 66 is designed to travel in the guide furrow that is always made for the purpose of guiding the tractor.

The disks, 58, are adjusted so that they will cut a furrow directly in front of the tractor wheels, as shown in Figure 1 and are adjusted as to depth of cut by means of washer 50 and pin 51 and by the position of stops 39.

The device described above is for use in connection with the cultivation of listed fields in which the lister furrows are dammed and where cultivation requires that the tractor shall cross the field at right angles to the dams and in Figures 9 and 10 a cross section of such a field has been shown.

In Figure 9 reference numerals 67 designate the tops of parallel ridges that are separated by furrows 68. Extending across the furrows, at spaced intervals, are dams 69.

The tractor wheels are so spaced that they will travel along the inclined sides of two spaced ridges and not in the bottoms of the furrows for it is evident that when the wheels reach a dam they will have to rise and the nearer the wheels are to the centers of the furrows the greater will be the distance that they will rise.

In Figure 8 the positions of the disks 58 are shown and as the tractor moves forwardly these disks plow furrows for the wheels. The soil is thrown into the bottoms of the furrows as indicated by numeral 70 in Figure 10.

It is apparent that when a tractor is provided with the device described above and illustrated on the drawings, furrows will be provided for the tractor wheels and since the plowing disks can be adjusted to any desired depth, the bottoms of the furrows will provide an even surface for the tractor wheels. The wheel 66 is positioned so as to travel on the top of the center ridge and may be adjusted along bar 17 to the desired position. The wheel 66 can be replaced by a runner and in Fig. 11 a fragmentary side elevation has been shown in which runner 666 has replaced the caster wheel. The runner is preferably of considerable length so that it will simultaneously rest on two adjacent ridges when passing across a listed field. The bottom is transversely concave as shown in Fig. 12.

It is evident that the device shown and described will plow furrows that are substantially of uniform depth and that it will permit a limited amount of rocking of the tractor axle without affecting its adjustment since the loose hinges and the use of the caster wheel permits considerable relative movement of the tractor and the frame. When the parts are properly adjusted the tractor will have very little tendency to rock or to tilt because the furrows in which its wheels travel are of even depth and quite smooth.

The depth to which the disks cut is controlled by the force exerted by springs 37 and 49 and by the hardness of the ground as the force must be sufficient to keep the disks as deep as they can go on account of wheel 66.

The device shown on the drawings and described above may be varied as to its specific embodiment and applicant contemplates variations within the terms of the appended claims.

The apparatus described above is designed more particularly for four-wheel tractors of the type in which the front and the rear wheels are equally spaced. There is another type of tractor in common use in which the two front wheels are close together and are located near the center line of the tractor, and for use with such tractors the apparatus must be slightly modified.

In Figs. 13, 14 and 15 my apparatus has been shown applied to the latter type of tractor. Such parts of the apparatus as are identical with the parts above described have been designated by the same reference characters and such parts as are similar in function but differ somewhat in form are designated by similar reference characters.

Referring now to Figs. 13 and 14, reference numeral 80 designates the engine or body of the tractor and has been shown dotted, attached to the sides of the engine is a forwardly extending frame comprising two flat bars 16a whose front ends are joined by a transverse bar 17a. The front wheels 66a are connected with the transverse frame member 17a in a manner similar to that employed with caster wheel 66. Suitable means, not shown, is provided for turning the front wheels to guide the tractor. Arms 40a are attached to the frame members by means of pivots 24a and have their free ends provided with bearings for shaft 43, which bearings correspond to 42 in Fig. 8. Shaft 43 is made of two parts connected by a sleeve 52, all as shown in Fig. 1. Secured to the outer ends of shaft 43, by means similar to that shown in Figs. 1, 3 and 4, are disks 58 which are so positioned that they provide furrows for the drive wheels 81 to travel in. Arms 55, having fingers 57 are clamped to shaft 43 by set screws and engage arm 40a to prevent the shaft from turning.

A shaft 28a is journalled in bearings 12a and is provided at its ends with radially extending arms 82 having openings for the reception of the rods 46a whose lower ends are attached to arms 40a by means of a plate 48a. Helical compression springs 49 surround rods 46a, between the arms 82 and the parts 48a. Washers 50 and pins 51 limit the downward movement of rods 46a and by rotating shaft 28a clockwise, shaft 43 and disks 58 may be raised. By rotating shaft 28a counterclockwise the springs may be put under greater compression. A rod 33 has one end connected with an arm 29 and the other connected with a suitable lever, not shown, by means of which shaft 28a can be turned and held in adjusted position.

In this embodiment the front wheels 66a serve a function analogous to that served by caster wheel 66.

It will be evident that the two devices are substantially identical in function and operation and that the differences are merely such as are made necessary to make them fit different types of tractors.

Having described the invention what is claimed as new is:

1. An implement for use with a farm tractor, comprising in combinations, a frame having means at one end for supporting it from the tractor and extending forwardly therefrom, a bar positioned below the frame and extending transversely thereof, means for attaching the bar to the frame for movement toward and away therefrom comprising arms pivoted to the frame, resilient means positioned between the bar and the frame to urge the bar downwardly, means for limiting the downward movement of the bar, and a furrow forming device attached to each end of the bar.

2. An implement comprising two spaced brackets for attachment to a farm tractor, a frame comprising two side members and an end member, means for effecting a hinged connection between the ends of the side members and the brackets, means carried by the brackets and connected with the frame for moving it about the hinged connections, means for limiting the downward movement of the frame, and two furrow forming tools carried by the frame and positioned to form furrows for the wheels of the tractor.

3. An implement for use with a wheeled farm tractor for providing furrows for the tractor wheels to travel in, comprising a pair of spaced brackets for attachment to the front end of a tractor, a frame hingedly attached to the brackets, means carried by the brackets and connected with the frame for raising and lowering it about the hinges, said means comprising a spring for exerting a yielding force on the frame and urging it downwardly, a support device secured to the frame for movable engagement with the ground, a bar extending transversely of the frame beneath the same, means for yieldably supporting the bar from the frame, and a furrow forming tool at each end of the bar.

4. An implement for use with a wheeled farm tractor for providing furrows for the tractor wheels to travel in, comprising a pair of spaced brackets for attachment to the front end of a tractor, a frame hingedly attached to the brackets, means carried by the brackets and connected with the frame for raising and lowering it about the hinges, said means comprising a spring for exerting a yielding force on the frame and urging it downwardly, a support device secured to the frame for movable engagement with the ground, a bar extending transversely of the frame beneath the same, arms pivoted to the frame in front of the bar and connected with the bar, a spring associated with each arm to urge it downwardly, means for adjusting the extent of the downward movement, and a furrow forming tool at each end of the bar, positioned to provide furrows for the tractor wheels.

5. An implement for use with a wheeled farm tractor for providing furrows for the tractor wheels to travel in, comprising a pair of spaced brackets for attachment to the front end of a tractor, a frame hingedly attached to the brackets, means carried by the brackets and connected with the frame for raising and lowering it about the hinges, said means comprising a spring for exerting a yielding force on the frame and urging it downwardly, a support device secured to the frame for movable engagement with the ground, a bar extending transversely of the frame beneath the same, arms pivoted to the frame in front of the bar and connected with the bar, a spring associated with each arm to urge it downwardly, means for adjusting the extent of the downward movement, means non-rotatably connected with the bar and engaging the arm for holding the bar from rotation, and a furrow forming tool attached to each end of the bar.

6. A device in accordance with claim 4 in which the bar is adjustable to vary its length.

7. An implement for use with a wheeled farm tractor for providing furrows for the tractor wheels to travel in, comprising a pair of spaced brackets for attachment to the front end of a tractor, a frame hingedly attached to the brackets, means carried by the brackets and connected with the frame for raising and lowering it about the hinges, said means comprising a spring for exerting a yielding force on the frame and urging it downwardly, a support device secured to the frame for movable engagement with the ground, a bar extending transversely of the frame beneath the same, arms pivoted to the frame in front of the bar and connected with the bar, a spring associated with each arm to urge it downwardly, means for adjusting the extent of the downward movement, means nonrotatably connected with the bar and engaging the arm for holding the bar from rotation, a furrow forming disk attached to each end of the bar, and means for varying the angle between the plane of rotation of the disk and the axis of the bar.

8. An implement for use with a wheeled farm tractor for providing furrows for the tractor wheels to travel in, comprising a pair of spaced brackets for attachment to the front end of a tractor, a frame hingedly attached to the brackets, means carried by the brackets and connected with the frame for raising and lowering it about the hinges, said means comprising a spring for exerting a yielding force on the frame and urging it downwardly, a support device secured to the frame for movable engagement with the ground, a bar extending transversely of the frame beneath the same, arms pivoted to the frame in front of the bar and connected with the bar, a spring associated with each arm to urge it downwardly, means for adjusting the extent of the downward movement, means nonrotatably connected with the bar and engaging the arm for holding the bar from rotation, a furrow forming disk attached to each end of the bar, and means for varying the angle between the plane of rotation of the disk and the axis of the bar, said last named means comprising two interengaging members having opened ribbed surfaces and a bolt for forcing the ribs into interlocking engagement.

9. An implement of the class specified, comprising in combination, two brackets each having one end provided with means for attaching it to the front axle of a wheeled farm tractor and the other ends provided with hinge members, a frame having one end provided with hinge members cooperating with those on the brackets whereby a pivotal connection is effected, means carried by the brackets for turning the frame about the hinges, two arms pivoted to the frame near its front end, a bar connected with the free ends of the arms, means secured to the bar and engaging the arms for nonrotatably interlocking the bar and the arms, a spring positioned between each arm and the frame for urging the arms downwardly, means for limiting the downward movement, and a furrow forming tool attached to each end of the bar.

10. An implement of the class specified, comprising in combination, two brackets each having one end provided with means for attaching it to the front axle of a wheeled farm tractor and the other ends provided with hinge members, a frame having one end provided with hinge members cooperating with those on the brackets whereby a pivotal connection is effected, means carried by the brackets for turning the frame about the hinges, two arms pivoted to the frame near its front end, a bar connected with the free ends of the arms, means secured to the bar and engaging the arms for non-rotatably interlocking the bar and the arms, a spring positioned between each arm and the frame for urging the arms downwardly, means for limiting the downward movement, and a furrow forming disk attached to each end of the bar.

11. An implement of the class specified, comprising in combination, two brackets each having one end provided with means for attaching it to the front axle of a wheeled farm tractor and the other ends provided with hinge members, a frame having one end provided with hinge members cooperating with those on the brackets whereby a pivotal connection is effected, means carried by the brackets for turning the frame about the hinges, two arms pivoted to the frame near its front end, a bar connected with the free ends of the arms, means secured to the bar and engaging the arms for nonrotatably interlocking the bar and the arms, a spring positioned between each arm and the frame for urging the arms downwardly, means for limiting the downward movement, and a furrow forming disk attached to each end of the bar, the bar being extensible whereby the distance between the furrow forming devices can be varied.

12. An implement for use with wheeled farm tractors for providing a smooth track for the wheels, comprising in combination, two brackets each having one end provided with means for effecting a connection with the front axle of a tractor the other ends being provided with hinge elements, a frame having hinge elements operatively connected with the hinge elements on the brackets, a shaft carried by the brackets and mounted for limited rotation, a crank arm extending radially from the shaft, means for rocking the shaft, a perforated lug extending upwardly from the frame near its front end, a rod pivotally connected with the upper end of the crank arm, a helical coil spring on the rod one end of the spring abutting the lug, a movable abutment on the rod for engaging the other end of the spring, a stop on the rod for engaging the front side of the lug for raising the frame, a bar extending across the frame and positioned underneath it, means for attaching the bar to the frame for movement towards and away from it, springs positioned between the frame and the bar for resisting movement of the bar towards the frame, means for limiting the downward movement of the bar and furrow making tools connected with the ends of the bar.

13. An implement for use with farm tractors, comprising in combination, a frame having spaced sides, means for supporting the frame a predetermined distance above the ground, a bar positioned below the frame and extending transversely thereof, means for attaching the bar to the frame for movement toward and away from the frame, means for exerting a yielding force on the bar to move it downwardly, means for limiting the downward movement, and furrow forming devices attached to the ends of the bar.

14. An implement for use with farm tractors, comprising in combination, a frame having spaced sides, means for supporting the frame a predetermined distance above the ground, a bar positioned below the frame and extending transversely thereof, means comprising arms, having a pivotal connection with the frame and a tiltable connection with the bar for attaching the latter to the frame, said connection permitting the bar to move towards and away from the frame, resilient means comprising springs for exerting a yielding force on the bar tending to move it downwardly and away from the frame, means for limiting the downward movement, and furrow forming tools on the ends of the bar.

15. An implement for use with farm tractors, comprising in combination, a frame having spaced sides, means for supporting the frame a predetermined distance above the ground, a bar positioned below the frame and extending transversely thereof, means comprising arms having a pivotal connection with the frame and a tiltable connection with the bar for attaching the latter to the frame, said connection permitting the bar to move towards and away from the frame, resilient means comprising springs for exerting a yielding force on the bar tending to move it downwardly and away from the frame, means for limiting the downward movement, furrow forming tools on the ends of the bar, and means for varying the downward pressure on the bar.

16. An implement for use with farm tractors, comprising in combination, a frame having spaced sides, means for supporting the frame a predetermined distance above the ground, a bar positioned below the frame and extending transversely thereof, means comprising arms having a pivotal connection with the frame and a tiltable connection with the bar for attaching the latter to the frame, said connection permitting the bar to move towards and away from the frame, resilient means comprising springs for exerting a yielding force on the bar tending to move it downwardly and away from the frame, means for limiting the downward movement, furrow forming tools on the ends of the bar, means for varying the downward pressure on the bar, and means for raising the bar and the furrow forming tools so as to bring the latter into inoperative position.

CHARLES T. PEACOCK.